(12) United States Patent
Yu et al.

(10) Patent No.: US 10,862,166 B2
(45) Date of Patent: Dec. 8, 2020

(54) NON-AQUEOUS ELECTROLYTE SOLUTION AND LITHIUM SECONDARY BATTERY INCLUDING THE SAME

(71) Applicant: LG Chem, Ltd., Seoul (KR)

(72) Inventors: Sung Hoon Yu, Daejeon (KR); Kyung Mi Lee, Daejeon (KR); Shul Kee Kim, Daejeon (KR); Hyun Yeong Lee, Daejeon (KR); Yoo Sun Kang, Daejeon (KR)

(73) Assignee: LG Chem, Ltd.

( * ) Notice: Subject to any disclaimer, the term of this patent is extended or adjusted under 35 U.S.C. 154(b) by 0 days.

(21) Appl. No.: 16/078,894

(22) PCT Filed: Jan. 12, 2018

(86) PCT No.: PCT/KR2018/000648
§ 371 (c)(1),
(2) Date: Aug. 22, 2018

(87) PCT Pub. No.: WO2018/131954
PCT Pub. Date: Jul. 19, 2018

(65) Prior Publication Data
US 2019/0348713 A1 Nov. 14, 2019

(30) Foreign Application Priority Data

Jan. 12, 2017 (KR) ........................ 10-2017-0005600
Jan. 12, 2018 (KR) ........................ 10-2018-0004666

(51) Int. Cl.
*H01M 10/0567* (2010.01)
*C07F 7/18* (2006.01)
(Continued)

(52) U.S. Cl.
CPC ....... *H01M 10/0567* (2013.01); *C07F 7/1804* (2013.01); *H01M 10/0525* (2013.01); *H01M 10/4235* (2013.01); *H01M 2300/0025* (2013.01)

(58) Field of Classification Search
None
See application file for complete search history.

(56) References Cited

U.S. PATENT DOCUMENTS

2012/0171581 A1    7/2012  Abe et al.
2012/0315534 A1*  12/2012  Bhat ..................... C07F 7/0834
                                                                  429/188
2018/0130987 A1    5/2018  Takamatsu

FOREIGN PATENT DOCUMENTS

CN    102324563 A    1/2012
CN    102403534 A    4/2012
(Continued)

OTHER PUBLICATIONS

Extended European Search Report including Written Opinion for Application No. EP18738577.8 dated Jan. 10, 2019.
(Continued)

*Primary Examiner* — Daniel S Gatewood
(74) *Attorney, Agent, or Firm* — Lerner, David, Littenberg, Krumholz & Mentlik, LLP

(57) ABSTRACT

The present invention relates to a non-aqueous electrolyte solution for a lithium secondary battery, which includes a compound capable of suppressing an electrolyte solution side reaction in a high-temperature and high-voltage environment, and a lithium secondary battery in which cycle characteristics and stability are improved even during high-temperature and high-voltage charging by including the same.

6 Claims, 1 Drawing Sheet

(51) Int. Cl.
*H01M 10/0525* (2010.01)
*H01M 10/42* (2006.01)

(56) References Cited

FOREIGN PATENT DOCUMENTS

| | | | |
|---|---|---|---|
| JP | 03236169 A | * | 10/1991 |
| JP | H03236169 A | | 10/1991 |
| JP | 2007123097 A | | 5/2007 |
| JP | 2013145702 A | | 7/2013 |
| KR | 20140020328 A | | 2/2014 |
| WO | 2011034067 A1 | | 3/2011 |
| WO | 2016084330 A1 | | 6/2016 |

OTHER PUBLICATIONS

Search report from International Application No. PCT/KR2018/000648, dated Apr. 30, 2018.
Chinese Search Report for Application No. 201880001276.8, dated Sep. 29, 2020, pp. 1-2.

* cited by examiner

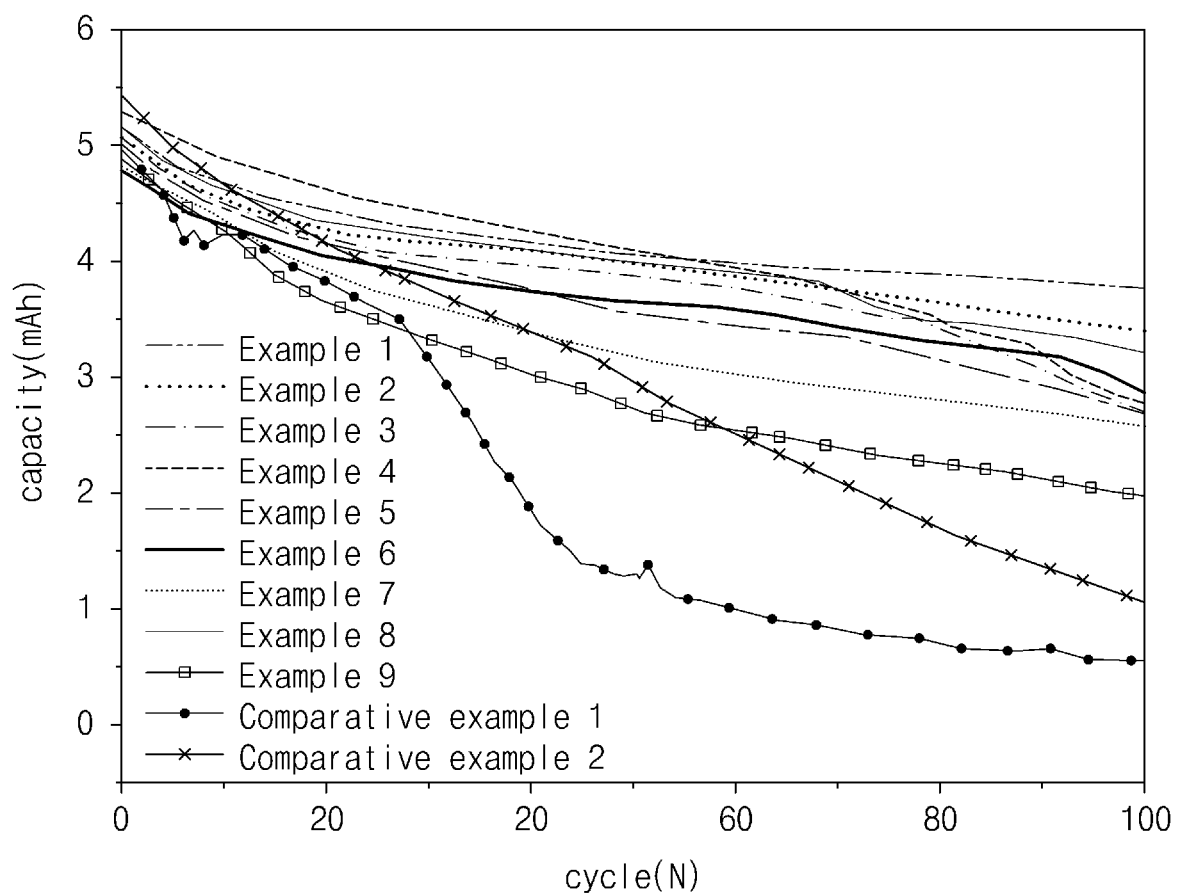

NON-AQUEOUS ELECTROLYTE SOLUTION AND LITHIUM SECONDARY BATTERY INCLUDING THE SAME

CROSS-REFERENCE TO RELATED APPLICATIONS

The present application is a national phase entry under 35 U.S.C. § 371 of International Application No. PCT/KR2018/000648 filed Jan. 12, 2018, which claims priority from Korean Patent Application Nos. 10-2017-0005600, filed on Jan. 12, 2017, and 10-2018-0004666, filed on Jan. 12, 2018, in the Korean Intellectual Property Office, the disclosure of which are incorporated herein by reference.

TECHNICAL FIELD

The present invention relates to a non-aqueous electrolyte solution for a lithium secondary battery, which may improve electrical characteristics by suppressing an electrolyte solution side reaction even in a high-voltage environment, and a lithium secondary battery including the same.

BACKGROUND ART

Recently, interests in energy storage technologies have been increasingly grown, and efforts to research and develop electrochemical devices have been gradually materialized while the application of the energy storage technologies is expanded to mobile phones, camcorders, notebook PCs, and even to electric vehicles.

The electrochemical devices have received most attention in this respect, and there emerges an interest in rechargeable secondary batteries among these electrochemical devices. In particular, among the currently used secondary batteries, lithium secondary batteries, developed in the early 1990's, are spotlighted because the lithium secondary batteries may have higher operating voltage and significantly higher energy density.

A lithium secondary battery has a structure in which an electrode assembly, in which a positive electrode, a porous separator, and a negative electrode are sequentially stacked, is impregnated in an electrolyte solution including a lithium salt.

Lithium ions of a positive electrode active material are discharged and intercalated into an active material layer of the negative electrode during charging, the lithium ions of the active material layer are discharged and intercalated into the positive electrode active material during discharging, and the electrolyte solution acts as a medium that transfers the lithium ions between the negative electrode and the positive electrode.

The electrolyte solution generally includes an organic solvent and an electrolyte salt, wherein, for example, an electrolyte solution, in which a lithium salt is added to a mixed solvent of cyclic carbonate having a high dielectric constant, such as propylene carbonate and ethylene carbonate, and linear carbonate such as diethyl carbonate, ethyl methyl carbonate, and dimethyl carbonate, is being commonly used.

Since the lithium salt mainly used as the electrolyte salt reacts very sensitively to moisture, the lithium salt reacts with moisture present in the battery or present during the preparation of the battery to form HX (where X=fluorine (F), chlorine (Cl), bromine (Br), or iodine (I)) as a kind of strong acid. Particularly, since a $LiPF_6$ lithium salt is unstable at high temperature, an anion is thermally decomposed to form an acidic substance such as hydrofluoric acid (HF).

When the acidic substance is present in the battery, the acidic substance may not only cause degradation of battery characteristics, for example, a decrease in capacity, a reduction in lifetime, and an increase in resistance of the secondary battery, but may also cause gas generation in the battery, and thus, it may be a cause of battery thickness expansion and explosion due to an increase in internal pressure of the lithium secondary battery.

PRIOR ART DOCUMENT

Japanese Patent Application Laid-open Publication No. 2007-123097

Korean Patent Application Laid-open Publication No. 2014-0020328

DISCLOSURE OF THE INVENTION

Technical Problem

An aspect of the present invention provides a non-aqueous electrolyte solution for a lithium secondary battery which includes an additive capable of suppressing the formation of a by-product caused by the decomposition of a lithium salt.

Another aspect of the present invention provides a lithium secondary battery in which cycle characteristics and stability are improved even during high-temperature and high-voltage charging by including the non-aqueous electrolyte solution.

Technical Solution

According to an aspect of the present invention, there is provided a non-aqueous electrolyte solution including:
an ionizable lithium salt;
an organic solvent; and
a compound represented by Formula 1:

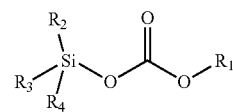

[Formula 1]

wherein, in Formula 1, $R_1$ to $R_4$ are each independently an alkyl group having 1 to 6 carbon atoms, an alkenyl group having 2 to 6 carbon atoms, or $-(CH_2)_n-R_5$, wherein $R_5$ is an aryl group having 6 to 18 carbon atoms, or an aryl group having 6 to 18 carbon atoms which is substituted with an alkyl group having 1 to 2 carbon atoms, and n is an integer of 0 to 2.

Specifically, in Formula 1, $R_1$ may be an alkyl group having 1 to 6 carbon atoms, or $-(CH_2)_n-R_5$, wherein $R_5$ may be an aryl group having 6 to 18 carbon atoms, or an aryl group having 6 to 18 carbon atoms which is substituted with an alkyl group having 1 to 2 carbon atoms, n may be an integer of 0 to 2, and $R_2$ to $R_4$ may each independently be an alkyl group having 1 to 6 carbon atoms or an alkenyl group having 2 to 6 carbon atoms.

The compound represented by Formula 1 may include at least one selected from the group consisting of compounds represented by Formulae 1a to 1f below.

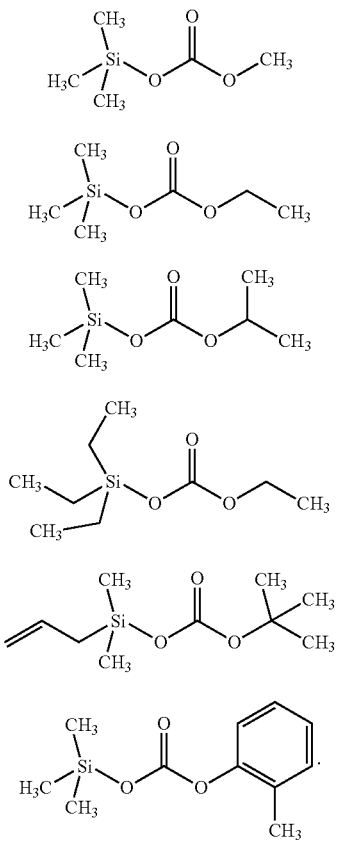

[Formula 1a]

[Formula 1b]

[Formula 1c]

[Formula 1d]

[Formula 1e]

[Formula 1f]

Specifically, the compound represented by Formula 1 may include at least one selected from the group consisting of the compounds represented by Formulae 1a to 1d and 1f.

The compound represented by Formula 1 may be included in an amount of about 0.5 wt % to about 40 wt %, for example, 1 wt % to 30 wt % based on a total weight of the non-aqueous electrolyte solution.

According to another aspect of the present invention, there is provided a lithium secondary battery including a negative electrode, a positive electrode, a separator disposed between the negative electrode and the positive electrode, and a non-aqueous electrolyte solution, wherein the non-aqueous electrolyte solution is the non-aqueous electrolyte solution of the present invention.

Advantageous Effects

According to an embodiment of the present invention, a lithium secondary battery having improved cycle life characteristics and stability may be prepared by including a non-aqueous electrolyte solution which includes an additive capable of suppressing the formation of a by-product emerge from a lithium salt.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

The Figure is a graph illustrating cycle life characteristics of lithium secondary batteries according to Experimental Example 1 of the present invention.

MODE FOR CARRYING OUT THE INVENTION

Hereinafter, the present invention will be described in more detail.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

An embodiment of the present invention aims at providing a non-aqueous electrolyte solution which includes an additive capable of suppressing the formation of a by-product from a lithium salt.

Also, the present invention provides a lithium secondary battery in which cycle characteristics and high-temperature storage performance are improved even during high-voltage charging by including the non-aqueous electrolyte solution.

Specifically, in an embodiment of the present invention, provided is a non-aqueous electrolyte solution for a lithium secondary battery which includes:

an ionizable lithium salt;
an organic solvent; and
a compound represented by the following Formula 1.

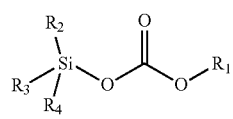

[Formula 1]

In Formula 1, $R_1$ to $R_4$ are each independently an alkyl group having 1 to 6 carbon atoms, an alkenyl group having 2 to 6 carbon atoms, or $-(CH_2)_n-R_5$, wherein $R_5$ is an aryl group having 6 to 18 carbon atoms, or an aryl group having 6 to 18 carbon atoms which is substituted with an alkyl group having 1 to 2 carbon atoms, and n is an integer of 0 to 2.

A lithium salt included in a conventional electrolyte solution for a lithium secondary battery is a component that reacts very sensitively to moisture, wherein the lithium salt reacts with moisture present in the battery or present during the preparation of the battery to form a by-product, such as HX (where X=fluorine (F), chlorine (Cl), bromine (Br), or iodine (I)), as a kind of strong acid. Particularly, since a $LIPF_6$ among the lithium salts is unstable at high temperature, $LIPF_6$ forms an acidic substance, such as hydrofluoric acid (HF), during thermal decomposition. In a case in which the acidic substance is present in the battery, it causes a side reaction to degrade characteristics of the secondary battery.

Specifically, the HX substance causes a rapid oxidation reaction in the battery to be able to dissolve or degrade a metal from a positive electrode active material. In a case in which the metal is dissolved from the positive electrode active material, since the dissolved metal forms an additional negative electrode film while being electrodeposited on a negative electrode, resistance of the negative electrode is further increased. Furthermore, a by-product, such as lithium fluoride (LiF), formed during the formation of the hydrofluoric acid (HF) increases positive electrode interfacial resistance by being adsorbed on a surface of a positive electrode. Due to these effects, overall performance, such as cycle life characteristics, of the secondary battery may be degraded.

In addition, during initial charge of the lithium secondary battery, a non-aqueous carbonate-based polar solvent reacts with lithium ions in the electrolyte solution to form a solid electrolyte interface (SEI) film on a surface of the negative electrode. The SEI acts as a protective layer which stabilizes the battery by suppressing the decomposition of the carbonate-based electrolyte solution on the surface of the negative electrode. The SEI film may be slowly collapsed by increased electrochemical energy and thermal energy when charge and discharge of the battery continuously proceeds, particularly, during high-temperature storage in a fully charged state. In a case in which the SEI film is collapsed, the exposed surface of a negative electrode active material reacts with the electrolyte solution solvent to continuously cause a side reaction, and, as a result, degradation of battery characteristics, for example, a decrease in capacity, a reduction in lifetime, and an increase in resistance of the battery, may occur.

The SEI film may be easily destroyed by the acidic substance such as HX (where X=F, Cl, Br, or I). Thus, in a case in which the HX substance is formed in the secondary battery, since the continuous regeneration of the SEI film is induced, an amount of film on the negative electrode is increased, and, as a result, interfacial resistance of the negative electrode may be increased.

In addition, since the HF gas generated may increase internal pressure of the secondary battery to cause a short circuit or thickness expansion of the battery, it may be a cause of reduction in stability.

Thus, in the present invention, the electrolyte solution side reaction may be suppressed by including the compound represented by Formula 1 as an additive or solvent in the non-aqueous electrolyte solution.

That is, since the compound represented by Formula 1 contains a Si—O structure in which a silicon (Si) atom is bonded to an oxygen atom of a carbonate group, hydrofluoric acid (HF) present in the electrolyte solution may be consumed while forming a Si—F bond by a substitution reaction with the hydrofluoric acid (HF) formed by the thermal decomposition of the lithium salt ($LiPF_6$). As a result, the damage to the SEI film may be prevented to suppress the increase in the amount of the film on the negative electrode film, a stable ionic conductive film may be formed on the surface of the positive electrode by preventing the rapid oxidation reaction due to the hydrofluoric acid, and the dissolution of the metal from the positive electrode active material may be suppressed.

Therefore, cycle life characteristics and stability of the lithium secondary battery including the non-aqueous electrolyte solution, which includes the compound represented by Formula 1 as an additive or solvent, may be improved even at high temperature and high voltage.

In the compound represented by Formula 1 which is included in the non-aqueous electrolyte solution of the present invention, $R_1$ is an alkyl group having 1 to 6 carbon atoms, or —$(CH_2)_n$—$R_5$, wherein $R_5$ is an aryl group having 6 to 18 carbon atoms, or an aryl group having 6 to 18 carbon atoms which is substituted with an alkyl group having 1 to 2 carbon atoms, n is an integer of 0 to 2, and $R_2$ to $R_4$ are each independently an alkyl group having 1 to 6 carbon atoms or an alkenyl group having 2 to 6 carbon atoms.

In this case, the alkyl group may be a methyl group, an ethyl group, or a propyl group, the alkenyl group may be a propenyl group, and the aryl group may be one selected from the group consisting of a phenyl group, a halophenyl group, a benzyl group, a halobenzyl group, a tolyl group, a naphthyl group, a trihalophenyl group, a trihalomethylphenyl group, a halonitrobenzyl group, an anthryl group, and a phenanthryl group.

Specifically, the compound represented by Formula 1 may include at least one selected from the group consisting of compounds represented by Formulae 1a to 1f below.

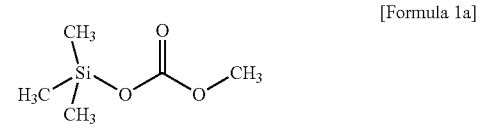

[Formula 1a]

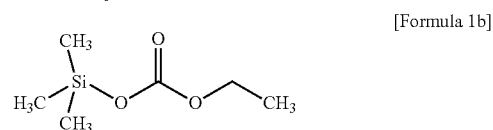

[Formula 1b]

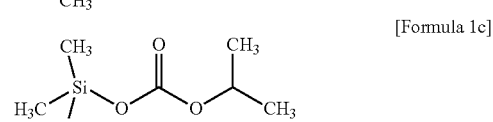

[Formula 1c]

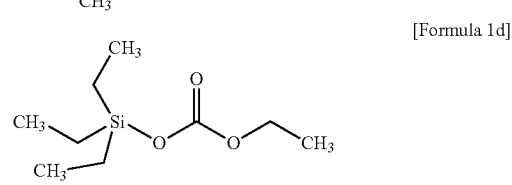

[Formula 1d]

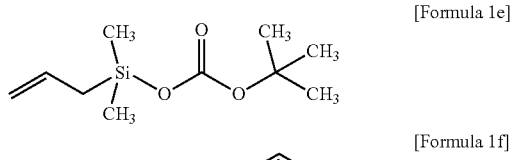

[Formula 1e]

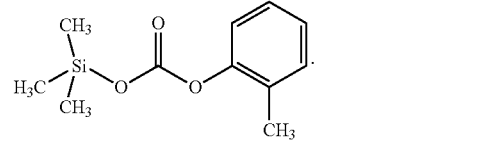

[Formula 1f]

For example, the compound represented by Formula 1 may include at least one selected from the group consisting of the compounds represented by Formulae 1a to 1d and 1f.

With respect to the compound represented by Formula 1e among the compounds represented by Formulae 1a to 1f, since the compound represented by Formula 1e includes a double bond, it may form a film on the surface of the negative electrode. However, since an effect of suppressing the dissolution of the metal from the positive electrode is reduced while the additive is consumed to form the negative electrode film, the cycle life characteristics improvement effect may not be apparent.

In the non-aqueous electrolyte solution for a lithium secondary battery according to the embodiment of the present invention, the compound represented by Formula 1 may be included in an amount of about 0.5 wt % to about 40 wt %, for example, 1 wt % to 30 wt % based on a total weight of the non-aqueous electrolyte solution. If the amount of the compound is less than 0.5 wt %, the effect of suppressing the electrolyte solution side reaction may be insignificant or the effect of suppressing the metal dissolution may be insignificant, and, if the amount of the compound represented by Formula 1 is greater than 40 wt %, since resistance is increased due to the excessive formation of the film, the cycle life characteristics may be reduced.

In the electrolyte solution for a lithium secondary battery according to the embodiment of the present invention, any electrolyte salt typically used in an electrolyte solution for a lithium secondary battery may be used as the electrolyte salt without limitation, and, for example, the lithium salt may include $Li^+$ as a cation, and may include at least one selected from the group consisting of $F^-$, $Cl^-$, $Br^-$, $I^-$, $NO_3^-$, $N(CN)_2^-$, $BF_4^-$, $ClO_4^-$, $AlO_4^+$, $AlCl_4^+$, $PF_6^-$, $SbF_6^-$, $AsF_6^-$, $BF_2C_2O_4^-$, $BC_4O_8^-$, $PF_4C_2O_4^-$, $PF_2C_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$ as an anion. Specifically, the lithium salt may include a single material selected from the group consisting of LiCl, LiBr, LiI, $LiClO_4$, $LiBF_4$, $LiB_{10}Cl_{10}$, $LiPF_6$, $LiCF_3SO_3$, $LiCH_3CO_2$, $LiCF_3CO_2$, $LiAsF_6$, $LiSbF_6$, $LiAlCl_4$, $LiAlO_4$, and $LiCH_3SO_3$, or a mixture of two or more thereof, and, in addition thereto, an electrolyte salt, such as a lithium imide salt represented by lithium bisperfluoroethanesulfonimide (LiBETI, $LiN(SO_2C_2F_5)_2$), lithium fluorosulfonyl imide (LiFSI, $LiN(SO_2F)_2$), and lithium (bis) trifluoromethanesulfonimide (LiTFSI, $LiN(SO_2CF_3)_2$) which are typically used in the electrolyte solution of the lithium secondary battery, may be used without limitation. Specifically, the electrolyte salt may include a single material selected from the group consisting of $LiPF_6$, $LiBF_4$, $LiCH_3CO_2$, $LiCF_3CO_2$, $LiCH_3SO_3$, LiFSI, LiTFSI, and $LiN(C_2FSO_2)_2$, or a mixture of two or more thereof.

The electrolyte salt may be appropriately changed in a normally usable range, but may be included in a concentration of 0.8 M to 1.5 M in the electrolyte solution to obtain an optimum effect of forming an anti-corrosion film on the surface of the electrode. In a case in which the concentration of the electrolyte salt is greater than 1.5 M, the film-forming effect may be reduced.

Also, in the electrolyte solution for a lithium secondary battery of the present invention, the organic solvent is not limited as long as it may minimize decomposition due to an oxidation reaction during charge and discharge of the secondary battery and may exhibit desired characteristics with an additive. For example, an ether-based solvent, an ester-based solvent, or an amide-based solvent may be used alone or in mixture of two or more thereof.

As the ether-based solvent among the organic solvents, any one selected from the group consisting of dimethyl ether, diethyl ether, dipropyl ether, methylethyl ether, methylpropyl ether, and ethylpropyl ether, or a mixture of two or more thereof may be used, but the present invention is not limited thereto.

Furthermore, the ester-based solvent may include at least one compound selected from the group consisting of a cyclic carbonate compound, a linear carbonate compound, a linear ester compound, and a cyclic ester compound.

Among these compounds, specific examples of the cyclic carbonate compound may be any one selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, and fluoroethylene carbonate (FEC), or a mixture of two or more thereof.

Also, specific examples of the linear carbonate compound may be any one selected from the group consisting of dimethyl carbonate (DMC), diethyl carbonate (DEC), dipropyl carbonate, ethyl methyl carbonate (EMC), methylpropyl carbonate, and ethylpropyl carbonate, or a mixture of two or more thereof, but the present invention is not limited thereto.

Specific examples of the linear ester compound may be any one selected from the group consisting of methyl acetate, ethyl acetate, propyl acetate, methyl propionate, ethyl propionate, propyl propionate, and butyl propionate, or a mixture of two or more thereof, but the present invention is not limited thereto.

Specific examples of the cyclic ester compound may be any one selected from the group consisting of γ-butyrolactone, γ-valerolactone, γ-caprolactone, δ-valerolactone, and ε-caprolactone, or a mixture of two or more thereof, but the present invention is not limited thereto.

Among the ester-based solvents, since the cyclic carbonate-based compound is well dissociate the lithium salt in the electrolyte due to high permittivity as a highly viscous organic solvent, the cyclic carbonate-based compound may be preferably used. When the above cyclic carbonate-based compound is mixed with the low viscosity, low permittivity linear carbonate-based compound, such as dimethyl carbonate and diethyl carbonate, and the linear ester-based compound in an appropriate ratio, the electrolyte solution having high electrical conductivity may be prepared.

Furthermore, the non-aqueous electrolyte solution for a lithium secondary battery according to the embodiment of the present invention may further include an additive for forming an SEI film, if necessary. As the additive for forming an SEI film which may be used in the present invention, vinylene carbonate, vinyl ethylene carbonate, fluoroethylene carbonate, cyclic sulfite, saturated sultone, unsaturated sultone, and a non-cyclic sulfone may be used alone or in a mixture of two or more thereof.

In this case, the cyclic sulfite may include ethylene sulfite, methyl ethylene sulfite, ethyl ethylene sulfite, 4,5-dimethyl ethylene sulfite, 4,5-diethyl ethylene sulfite, propylene sulfite, 4,5-dimethyl propylene sulfite, 4,5-diethyl propylene sulfite, 4,6-dimethyl propylene sulfite, 4,6-diethyl propylene sulfite, and 1,3-butylene glycol sulfite, the saturated sultone may include 1,3-propane sultone and 1,4-butane sultone, the unsaturated sultone may include ethene sultone, 1,3-propene sultone, 1,4-butene sultone, and 1-methyl-1,3-propene sultone, and the non-cyclic sulfone may include divinyl sulfone, dimethyl sulfone, diethyl sulfone, methyl ethyl sulfone, and methyl vinyl sulfone.

Also, in an embodiment of the present invention, provided is a lithium secondary battery including a positive electrode, a negative electrode, a separator disposed between the positive electrode and the negative electrode, and a non-aqueous electrolyte solution, wherein the non-aqueous electrolyte solution includes the non-aqueous electrolyte solution of the present invention.

That is, since the lithium secondary battery of the present invention includes the non-aqueous electrolyte solution including the compound represented by Formula 1, the negative electrode may smoothly intercalate and deintercalate lithium even at high temperature, and thus, overall performance, such as room-temperature and high-temperature life characteristics, of the secondary battery may be significantly improved.

The lithium secondary battery may be prepared by injecting the non-aqueous electrolyte solution of the present invention into an electrode assembly which is composed of the positive electrode, the negative electrode, and the separator disposed between the positive electrode and the negative electrode. In this case, those typically used in the preparation of the lithium secondary battery may all be used as the positive electrode, the negative electrode, and the separator which constitute the electrode assembly.

In this case, the positive electrode may be prepared by coating a positive electrode collector with a positive electrode slurry including a positive electrode active material, a binder, a conductive agent, and a solvent, and then drying and rolling the coated positive electrode collector.

The positive electrode collector is not particularly limited so long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used.

The positive electrode active material is a compound capable of reversibly intercalating and deintercalating lithium, wherein the positive electrode active material may specifically include a lithium composite metal oxide including lithium and at least one metal such as cobalt, manganese, nickel, or aluminum. Specifically, the lithium composite metal oxide may include lithium-manganese-based oxide (e.g., $LiMnO_2$, $LiMn_2O_4$, etc.), lithium-cobalt-based oxide (e.g., $LiCoO_2$, etc.), lithium-nickel-based oxide (e.g., $LiNiO_2$, etc.), lithium-nickel-manganese-based oxide (e.g., $LiNi_{1-Y}Mn_YO_2$ (where $0<Y<1$), $LiMn_{2-Z}Ni_ZO_4$ (where $0<Z<2$), etc.), lithium-nickel-cobalt-based oxide (e.g., $LiNi_{1-Y1}Co_{Y1}O_2$ (where $0<Y1<1$), lithium-manganese-cobalt-based oxide (e.g., $LiCo_{1-Y2}Mn_{Y2}O_2$ (where $0<Y2<1$), $LiMn_{2-Z1}C_{z1}O_4$ (where $0<Z1<2$), etc.), lithium-nickel-manganese-cobalt-based oxide (e.g., $Li(Ni_pCo_qMn_{r1})O_2$ (where $0<p<1$, $0<q<1$, $0<r1<1$, and $p+q+r1=1$) or $Li(Ni_{p1}Co_{q1}Mn_{r2})O_4$ (where $0<p1<2$, $0<q1<2$, $0<r2<2$, and $p1+q1+r2=2$), etc.), or lithium-nickel-cobalt-transition metal (M) oxide (e.g., $Li(Ni_{p2}CO_{q2}Mn_{r3}M_{S2})O_2$ (where M is selected from the group consisting of aluminum (Al), iron (Fe), vanadium (V), chromium (Cr), titanium (Ti), tantalum (Ta), magnesium (Mg), and molybdenum (Mo), and p2, q2, r3, and s2 are atomic fractions of each independent elements, wherein $0<p2<1$, $0<q2<1$, $0<r3<1$, $0<S2<1$, and $p2+q2+r3+S2=1$), etc.), and any one thereof or a compound of two or more thereof may be included. Among these materials, in terms of the improvement of capacity characteristics and stability of the battery, the lithium composite metal oxide may include $LiCoO_2$, $LiMnO_2$, $LiNiO_2$, lithium nickel manganese cobalt oxide (e.g., $Li(Ni_{0.6}Mn_{0.2}Co_{0.2})O_2$, $Li(Ni_{0.5}Mn_{0.3}Co_{0.2})O_2$, or $Li(Ni_{0.8}Mn_{0.1}Co_{0.1})O_2$), or lithium nickel cobalt aluminum oxide (e.g., $Li(Ni_{0.8}Co_{0.15}Al_{0.05})O_2$, etc.). In consideration of a significant improvement due to the control of type and content ratio of elements constituting the lithium composite metal oxide, the lithium composite metal oxide may include $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, or $Li(Ni_{0.8}Mn_{0.1}Co_{0.1})O_2$, and any one thereof or a mixture of two or more thereof may be used.

The positive electrode active material may be included in an amount of 80 wt % to 99 wt %, for example, 90 wt % to 99 wt % based on a total weight of solid content in the positive electrode slurry.

In a case in which the amount of the positive electrode active material is 80 wt % or less, since energy density is decreased, capacity may be reduced.

Also, the binder is a component that assists in the binding between the active material and the conductive agent and in the binding with the current collector, wherein the binder is commonly added in an amount of 1 wt % to 30 wt % based on the total weight of the solid content in the positive electrode slurry. Examples of the binder may be polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene terpolymer (EPDM), a sulfonated EPDM, a styrene-butadiene rubber, a fluoro rubber, various copolymers, and the like.

Furthermore, the conductive agent is a material providing conductivity while not causing chemical changes in the battery, wherein the conductive agent may be added in an amount of 1 wt % to 20 wt % based on the total weight of the solid content in the positive electrode slurry.

As typical examples of the conductive agent, a conductive material, such as: carbon powder such as carbon black, acetylene black, Ketjen black, channel black, furnace black, lamp black, or thermal black; graphite powder such as natural graphite with a well-developed crystal structure, artificial graphite, or graphite; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used, and those currently sold under the names, such as acetylene black-based conductive agents (Chevron Chemical Company, Denka black (Denka Singapore Private Limited), or Gulf Oil Company), Ketjen black, ethylene carbonate (EC)-based conductive agents (Armak Company), Vulcan XC-72 (Cabot Company), and Super P (Timcal Graphite & Carbon), may be used.

Also, the solvent may include an organic solvent, such as N-methyl-2-pyrrolidone (NMP), and may be used in an amount such that desirable viscosity is obtained when the positive electrode active material as well as selectively the binder and the conductive agent are included. For example, the solvent may be included in an amount such that a concentration of the solid content in the slurry including the positive electrode active material as well as selectively the binder and the conductive agent is in a range of 10 wt % to 60 wt %, for example, 20 wt % to 50 wt %.

Furthermore, the negative electrode, for example, may be prepared by coating a negative electrode collector with a negative electrode slurry including a negative electrode active material, a binder, a conductive agent, and a solvent, and then drying and rolling the coated negative electrode collector.

The negative electrode collector generally has a thickness of 3 μm to 500 μm. The negative electrode collector is not particularly limited so long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, an aluminum-cadmium alloy, or the like may be used. Also, similar to the positive electrode collector, the negative electrode collector may have fine surface roughness to improve bonding strength with the negative electrode active material, and the negative electrode collector may be used in various shapes such as a film, a sheet, a foil, a net, a porous body, a foam body, a non-woven fabric body, and the like.

Furthermore, the negative electrode active material may include at least one selected from the group consisting of lithium metal, a carbon material capable of reversibly intercalating/deintercalating lithium ions, metal or an alloy of lithium and the metal, a metal composite oxide, a material which may be doped and undoped with lithium, and a transition metal oxide.

As the carbon material capable of reversibly intercalating/deintercalating lithium ions, a carbon-based negative electrode active material generally used in a lithium ion secondary battery may be used without particular limitation, and, as a typical example, crystalline carbon, amorphous carbon, or both thereof may be used. Examples of the crystalline carbon may be graphite such as irregular, planar, flaky, spherical, or fibrous natural graphite or artificial graphite, and examples of the amorphous carbon may be soft carbon (low-temperature sintered carbon) or hard carbon, mesophase pitch carbide, and fired cokes.

As the metal or the alloy of lithium and the metal, a metal selected from the group consisting of copper (Cu), nickel (Ni), sodium (Na), potassium (K), rubidium (Rb), cesium (Cs), francium (Fr), beryllium (Be), magnesium (Mg), calcium (Ca), strontium (Sr), silicon (Si), antimony (Sb), lead (Pb), indium (In), zinc (Zn), barium (Ba), radium (Ra), germanium (Ge), aluminum (Al), and tin (Sn), or an alloy of lithium and the metal may be used.

One selected from the group consisting of PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$, $Li_xFe_2O_3$ ($0 \leq x \leq 1$), $Li_xWO_2$ ($0 \leq x \leq 1$), and $Sn_xMe_{1-x}Me'_yO_z$ (Me: manganese (Mn), Fe, Pb, or Ge; Me': Al, boron (B), phosphorus (P), Si, Groups I, II and III elements of the periodic table, or halogen; $0 \leq x \leq 1$; $1 \leq y \leq 3$; $1 \leq z \leq 8$) may be used as the metal composite oxide.

The material, which may be doped and undoped with lithium, may include Si, $SiO_x$ ($0 < x < 2$), a Si—Y alloy (where Y is an element selected from the group consisting of alkali metal, alkaline earth metal, a Group 13 element, a Group 14 element, transition metal, a rare earth element, and a combination thereof, and is not Si), Sn, $SnO_2$, and Sn—Y (where Y is an element selected from the group consisting of alkali metal, alkaline earth metal, a Group 13 element, a Group 14 element, transition metal, a rare earth element, and a combination thereof, and is not Sn), and a mixture of $SiO_2$ and at least one thereof may also be used. The element Y may be selected from the group consisting of Mg, Ca, Sr, Ba, Ra, scandium (Sc), yttrium (Y), Ti, zirconium (Zr), hafnium (Hf), rutherfordium (Rf), V, niobium (Nb), Ta, dubnium (Db), Cr, Mo, tungsten (W), seaborgium (Sg), technetium (Tc), rhenium (Re), bohrium (Bh), Fe, Pb, ruthenium (Ru), osmium (Os), hassium (Hs), rhodium (Rh), iridium (Ir), palladium (Pd), platinum (Pt), Cu, silver (Ag), gold (Au), Zn, cadmium (Cd), B, Al, gallium (Ga), Sn, In, Ge, P, arsenic (As), Sb, bismuth (Bi), sulfur (S), selenium (Se), tellurium (Te), polonium (Po), and a combination thereof.

The transition metal oxide may include lithium-containing titanium composite oxide (LTO), vanadium oxide, and lithium vanadium oxide.

The negative electrode active material may be included in an amount of 80 wt % to 99 wt % based on a total weight of solid content in the negative electrode slurry.

Also, the binder is a component that assists in the binding between the conductive agent, the active material, and the current collector, wherein the binder is commonly added in an amount of 1 wt % to 30 wt % based on the total weight of the solid content in the negative electrode slurry. Examples of the binder may be polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene polymer (EPDM), a sulfonated EPDM, a styrene-butadiene rubber, a fluoro rubber, and various copolymers thereof.

Furthermore, the conductive agent is a component for further improving the conductivity of the negative electrode active material, wherein the conductive agent may be added in an amount of 1 wt % to 20 wt % based on the total weight of the solid content in the negative electrode slurry. Any conductive agent may be used without particular limitation so long as it has conductivity without causing adverse chemical changes in the battery, and, for example, a conductive material such as: graphite such as natural graphite or artificial graphite; carbon black such as acetylene black, Ketjen black, channel black, furnace black, lamp black, and thermal black; conductive fibers such as carbon fibers and metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives may be used.

The solvent may include water or an organic solvent, such as NMP and alcohol, and may be used in an amount such that desirable viscosity is obtained when the negative electrode active material as well as selectively the binder and the conductive agent are included. For example, the solvent may be included in an amount such that a concentration of the solid content including the negative electrode active material as well as selectively the binder and the conductive agent is in a range of 50 wt % to 75 wt %, for example, 50 wt % to 65 wt %.

Also, a typical porous polymer film used as a typical separator, for example, a porous polymer film prepared from a polyolefin-based polymer, such as an ethylene homopolymer, a propylene homopolymer, an ethylene-butene copolymer, an ethylene-hexene copolymer, and an ethylene-methacrylate copolymer, may be used alone or in a lamination therewith as the separator. Also, a typical porous nonwoven fabric, for example, a nonwoven fabric formed of high melting point glass fibers or polyethylene terephthalate fibers may be used, but the present invention is not limited thereto.

A shape of the lithium secondary battery of the present invention is not particularly limited, but a cylindrical type using a can, a prismatic type, a pouch type, or a coin type may be used.

Hereinafter, the present invention will be described in more detail according to examples. However, the invention may be embodied in many different forms and should not be construed as being limited to the embodiments set forth herein. Rather, these example embodiments are provided so that this description will be thorough and complete, and will fully convey the scope of the present invention to those skilled in the art.

EXAMPLES

Example 1

(Non-Aqueous Electrolyte Solution Preparation)

A non-aqueous electrolyte solution of the present invention was prepared by adding 1 g of the compound represented by Formula 1a to 99 g of a non-aqueous organic solvent (fluoroethylene carbonate (FEC):propylene carbonate (PC):ethyl methyl carbonate (EMC)=volume ratio of 30:10:60) in which 1 M $LiPF_6$ was dissolved.

(Positive Electrode Preparation)

40 g of a positive electrode active material slurry, in which lithium cobalt composite oxide ($LiCO_2$) as positive electrode active material particles, carbon black as a conductive agent, and polyvinylidene fluoride, as a binder, were mixed in a ratio of 90:5:5 (wt %), was mixed with 100 g of N-methyl-2-pyrrolidone (NMP) to prepare a positive electrode active material slurry. A 100 μm thick positive electrode collector (Al thin film) was coated with the positive electrode active material slurry, dried, and roll-pressed to prepare a positive electrode.

(Negative Electrode Preparation)

80 g of a negative electrode active material slurry, in which natural graphite as a negative electrode active material, polyvinylidene fluoride as a binder, and carbon black, as a conductive agent, were mixed in a ratio of 95:2:3 (wt %), was mixed with 100 g of N-methyl-2-pyrrolidone (NMP) to prepare a negative electrode active material slurry. A 90 μm thick negative electrode collector (Cu thin film) was coated with the negative electrode active material slurry, dried, and roll-pressed to prepare a negative electrode.

(Secondary Battery Preparation)

A coin-type cell was prepared by a typical method in which the positive electrode and negative electrode prepared by the above-described method were stacked with a polyethylene porous film, and a lithium secondary battery (battery capacity 5.5 mAh) was then prepared by injecting the prepared non-aqueous electrolyte solution thereinto.

Example 2

An electrolyte solution and a secondary battery including the same were prepared in the same manner as in Example 1 except that the compound of Formula 1b, instead of the compound of Formula 1a, was included during the preparation of the non-aqueous electrolyte solution.

Example 3

An electrolyte solution and a secondary battery including the same were prepared in the same manner as in Example 1 except that the compound of Formula 1c, instead of the compound of Formula 1a, was included during the preparation of the non-aqueous electrolyte solution.

Example 4

An electrolyte solution and a secondary battery including the same were prepared in the same manner as in Example 1 except that the compound of Formula 1d, instead of the compound of Formula 1a, was included during the preparation of the non-aqueous electrolyte solution.

Example 5

An electrolyte solution and a secondary battery including the same were prepared in the same manner as in Example 1 except that the compound of Formula 1e, instead of the compound of Formula 1a, was included during the preparation of the non-aqueous electrolyte solution.

Example 6

An electrolyte solution and a secondary battery including the same were prepared in the same manner as in Example 1 except that the compound of Formula 1f, instead of the compound of Formula 1a, was included during the preparation of the non-aqueous electrolyte solution.

Example 7

An electrolyte solution and a secondary battery including the same were prepared in the same manner as in Example 1 except that 40 g of the compound of Formula 1a was included in 60 g of the non-aqueous organic solvent during the preparation of the non-aqueous electrolyte solution.

Example 8

An electrolyte solution and a secondary battery including the same were prepared in the same manner as in Example 1 except that 0.5 g of the compound of Formula 1a was included in 99.5 g of the non-aqueous organic solvent during the preparation of the non-aqueous electrolyte solution.

Example 9

An electrolyte solution and a secondary battery including the same were prepared in the same manner as in Example 1 except that 45 g of the compound of Formula 1a was included in 55 g of the non-aqueous organic solvent during the preparation of the non-aqueous electrolyte solution.

Comparative Example 1

An electrolyte solution and a secondary battery including the same were prepared in the same manner as in Example 1 except that the compound of Formula 1a was not added during the preparation of the non-aqueous electrolyte solution.

Comparative Example 2

An electrolyte solution and a secondary battery including the same were prepared in the same manner as in Example 1 except that the compound of the following Formula 2, instead of the compound of Formula 1a, was added during the preparation of the non-aqueous electrolyte solution.

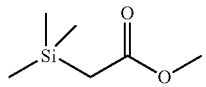

[Formula 2]

Experimental Examples

Experimental Example 1: Cycle Life Characteristics Evaluation

The secondary batteries prepared in Examples 1 to 9 and the secondary batteries prepared in Comparative Examples 1 and 2 were charged at a constant current of 0.7 C to a voltage of 4.35 V at 60° C. Thereafter, the batteries were charged at a constant voltage of 4.35 V and the charge was term inated when a charge current became 0.275 mA. After the batteries were left standing for 10 minutes, the batteries were discharged at a constant current of 0.5 C to a voltage of 3.0 V. After the charge and discharge were repeated for 100 cycles, battery capacities were measured, and the results thereof are presented in the Figure.

The expression "C" represents a C-rate, a charge/discharge current rate of a battery expressed by ampere (A), wherein it is typically expressed as a battery capacity ratio, and 1C means a current of 5.5 mA.

As illustrated in the Figure, it may be understood that cycle life characteristics of the batteries prepared in Examples 1 to 9 were better than those of the secondary batteries prepared in Comparative Examples 1 and 2.

With respect to the secondary battery of Example 9 which included the non-aqueous electrolyte solution including an excessive amount of the additive, it may be understood that cycle capacity characteristics after 100 cycles were improved in comparison to those of the secondary batteries of Comparative Examples 1 and 2, but the cycle capacity characteristics were degraded in comparison to those of the secondary batteries of Examples 1 to 8 due to an increase in resistance in the non-aqueous electrolyte solution.

Experimental Example 2: Co Ion Dissolution Evaluation

After the secondary batteries prepared in Examples 1 to 9 and the secondary batteries prepared in Comparative Examples 1 and 2, which were subjected to the high-temperature life characteristics evaluation in Experimental Example 1, were disassembled, a concentration of cobalt (Co) ions dissolved from the positive electrode was measured for the used separator by inductively coupled plasma (ICP) analysis.

The results thereof are presented in Table 1 below.

TABLE 1

| | Non-aqueous organic solvent | | Additive | | |
|---|---|---|---|---|---|
| | Type (volume ratio) | Amount added (g) | Formula | Amount added (g) | Co (ppm) |
| Example 1 | FEC:PC:EMC = 30:10:60 | 99 | 1a | 1 | 54 |
| Example 2 | FEC:PC:EMC = 30:10:60 | 99 | 1b | 1 | 50 |
| Example 3 | FEC:PC:EMC = 30:10:60 | 99 | 1c | 1 | 62 |
| Example 4 | FEC:PC:EMC = 30:10:60 | 99 | 1d | 1 | 45 |
| Example 5 | FEC:PC:EMC = 30:10:60 | 99 | 1e | 1 | 51 |
| Example 6 | FEC:PC:EMC = 30:10:60 | 99 | 1f | 1 | 58 |
| Example 7 | FEC:PC:EMC = 30:10:60 | 60 | 1a | 40 | 33 |
| Example 8 | FEC:PC:EMC = 30:10:60 | 99.5 | 1a | 0.5 | 65 |
| Example 9 | FEC:PC:EMC = 30:10:60 | 55 | 1a | 45 | 31 |
| Comparative Example 1 | FEC:PC:EMC = 30:10:60 | 100 | — | — | 375 |
| Comparative Example 2 | FEC:PC:EMC = 30:10:60 | 99 | 2 | 1 | 318 |

As illustrated in Table 1, it may be understood that the concentrations of the Co dissolved from the positive electrodes of the secondary batteries of Examples 1 to 9 were low at 65 ppm or less. In contrast, it may be understood that the concentration of the dissolved Co of the secondary battery of Comparative Example 1 and the concentration of the dissolved Co of the secondary battery of Comparative Example 2 were high at 375 ppm and 318 ppm, respectively. That is, with respect to the lithium secondary battery including the non-aqueous electrolyte solution of the present invention, since the amount of HF present or formed in the electrolyte solution may be reduced, a stable film may be formed on the surface of the positive electrode, and, accordingly, it may be confirmed that the dissolution of the metal from the electrode (positive electrode) was suppressed.

The invention claimed is:

1. A non-aqueous electrolyte solution for a lithium secondary battery, the non-aqueous electrolyte solution comprising:
   an ionizable lithium salt;
   an organic solvent; and
   a compound represented by Formula 1:

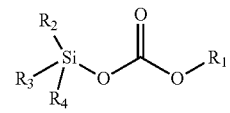

[Formula 1]

wherein, in Formula 1,
$R_1$ to $R_4$ are each independently an alkyl group having 1 to 6 carbon atoms, an alkenyl group having 2 to 6 carbon atoms, or $-(CH_2)_n-R_5$,
wherein $R_5$ is an aryl group having 6 to 18 carbon atoms, or an aryl group having 6 to 18 carbon atoms which is substituted with an alkyl group having 1 to 2 carbon atoms, and
n is an integer of 0 to 2,
wherein the compound represented by Formula 1 is included in an amount of 0.5 wt % to 40 wt % based on a total amount of the non-aqueous electrolyte solution.

2. The non-aqueous electrolyte solution for a lithium secondary battery of claim 1, wherein, in Formula 1, $R_1$ is an alkyl group having 1 to 6 carbon atoms, or $-(CH_2)_n-R_5$,
wherein $R_5$ is an aryl group having 6 to 18 carbon atoms, or an aryl group having 6 to 18 carbon atoms which is substituted with an alkyl group having 1 to 2 carbon atoms, n is an integer of 0 to 2, and
$R_2$ to $R_4$ are each independently an alkyl group having 1 to 6 carbon atoms or an alkenyl group having 2 to 6 carbon atoms.

3. The non-aqueous electrolyte solution for a lithium secondary battery of claim 1, wherein the compound of Formula 1 comprises at least one compound selected from the group consisting of compounds represented by Formulae 1a to 1f:

[Formula 1a]
[Formula 1b]
[Formula 1c]
[Formula 1d]
[Formula 1e]

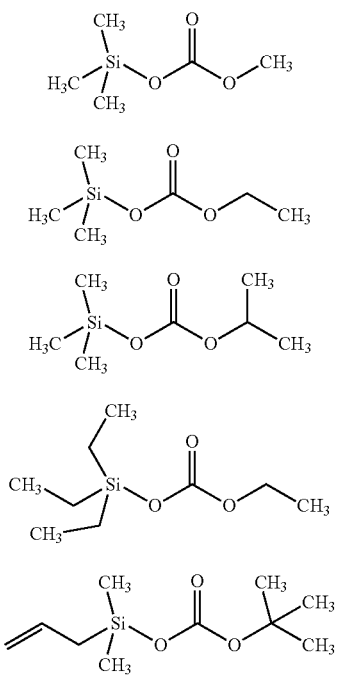

[Formula 1f]

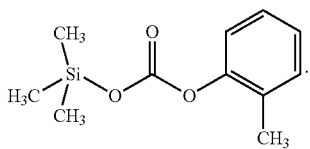

4. The non-aqueous electrolyte solution for a lithium secondary battery of claim 3, wherein the compound of Formula 1 comprises at least one compound selected from the group consisting of the compounds represented by Formulae 1a to 1d and 1f.

5. The non-aqueous electrolyte solution for a lithium secondary battery of claim 1, wherein the compound represented by Formula 1 is included in an amount of 1 wt % to 30 wt % based on a total amount of the non-aqueous electrolyte solution.

6. A lithium secondary battery comprising a negative electrode, a positive electrode, a separator disposed between the negative electrode and the positive electrode, and a non-aqueous electrolyte solution, wherein the non-aqueous electrolyte solution is the non-aqueous electrolyte solution for a lithium secondary battery of claim 1.

\* \* \* \* \*